Aug. 13, 1957　　D. G. CHASE ET AL　　2,802,986
METHOD OF AND AN APPARATUS FOR MEASURING
RADIO-FREQUENCY POWER
Filed Aug. 23, 1945
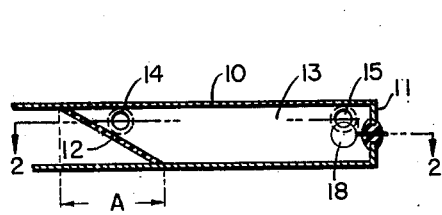
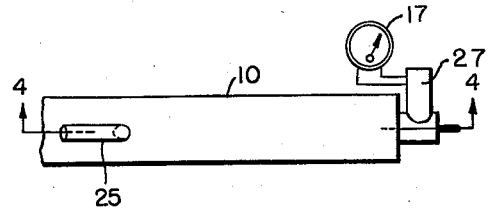
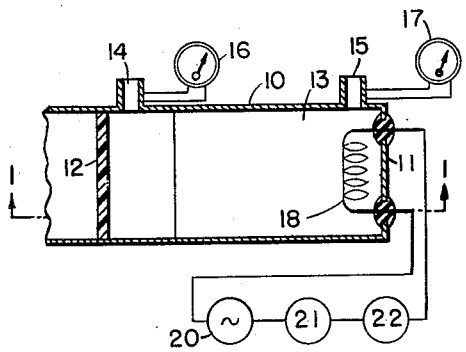
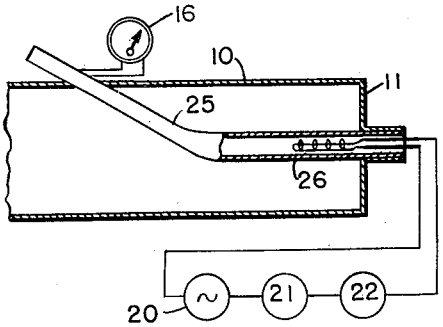
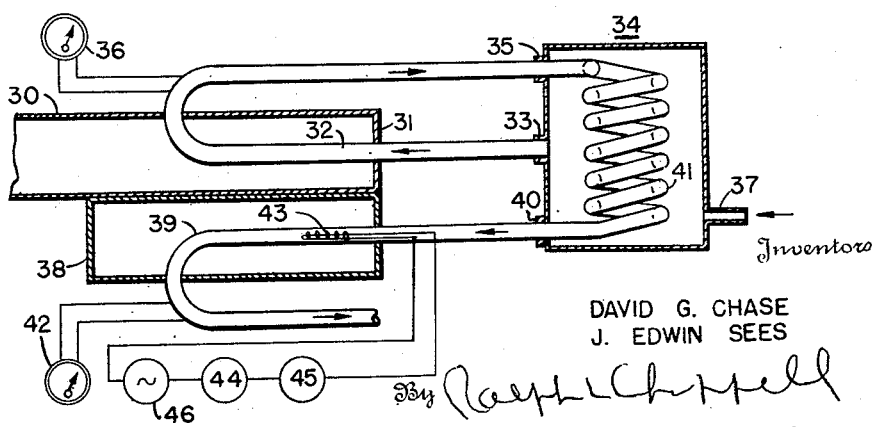
Inventors
DAVID G. CHASE
J. EDWIN SEES
By Ralph L. Chappell
Attorney

United States Patent Office 2,802,986
Patented Aug. 13, 1957

2,802,986

METHOD OF AND AN APPARATUS FOR MEASURING RADIO-FREQUENCY POWER

David G. Chase and James Edwin Sees, Washington, D. C.

Application August 23, 1945, Serial No. 612,290

2 Claims. (Cl. 324—95)

(Granted under Title 35, U. S. Code (1952), sec. 266)

This invention relates to a method of and an apparatus for measuring radio frequency power.

It is sometimes desirable in employing electronic equipment of the type which radiates radio frequency power to measure the amount of radiated power. When such radio frequency power is of a low frequency, it is often feasible to measure the power radiated by absorbing the power in a resistance and measuring the dissipated heat, among other well known methods. However, at high frequencies, and particularly wavelengths on the order of ten centimeters or less, considerable difficulty is encountered in employing the resistance method of evaluating radio frequency power. This is due in part to the fact that lumped circuits are no longer easily obtained at microwavelengths because the physical dimensions of any circuit component approach a magnitude comparable to the wavelength. Furthermore, designing a pure resistance for microwavelengths usually involves dimensions which are highly critical and the resultant resistance is then nonreactive for only a small range of frequencies.

In order to overcome these difficulties in measuring radio frequency power at high frequencies, it has sometimes been the practice to employ water as a lossy dielectric to dissipate the radio frequency energy, no metallic resistor being used in the radio frequency circuit in this method. One practice has been to provide a water load through which water is circulated at a constant rate and to apply to the water load the radio frequency energy the power of which is to be measured. The difference or gradient between the temperature of the water as it reaches the water load and the temperature of the water as it leaves the water load is then taken as an indication of the power absorbed by the water. By measuring the rate of flow of the water and the temperature rise, it is then possible to compute the power dissipation. However, for accurate power measurement this requires careful and tedious techniques, and apparatus which will eliminate errors due to thermal radiation, thermal conduction, frictional heating of the water, and inaccuracy in temperature measurement, the last being a very important item in most operational setups.

An object of the present invention is to provide an efficient and effective method of and apparatus for measuring radio frequency power and particularly for measuring radio frequency power at high frequencies.

In accordance with one embodiment of this invention, as applied to the measurement of radio frequency power present in a waveguide connected to a source of radio frequency energy, a water tight compartment is formed adjacent an end of the waveguide and water is circulated through this compartment at a constant rate and at a constant input temperature. A heating coil is disposed within the compartment and connected to an external source of power. In use, radio frequency energy is applied to the waveguide and heats the water. The difference between the temperature of the water as it is applied to the compartment and as it leaves the compartment is measured by suitable temperature measuring devices. Then the radio frequency is turned off and energy applied to the heating coil to heat the water again to obtain the same temperature difference, the power required to be applied to the heating coil to produce the same temperature gradient being then a direct indication of the radio frequency power applied to the waveguide.

In accordance with a second embodient of this invention, instead of forming a water compartment in a waveguide, a tube constructed of dielectric material is positioned within the waveguide. A heating coil is disposed within the tube and connected to an external energy source. The method of employing this alternative device is substantially the same as that described in conjunction with the first embodiment.

In accordance with a third embodiment of this invention, an alternative method of making the power measurement may be employed with the apparatus of either of the first two embodiments of this invention wherein initially more power is applied to the heating coil than the maximum anticipated radio frequency power to be measured, and the temperature difference and power consumed is noted. Then the radio frequency energy to be measured is applied to the waveguide and the power applied to the heating coil is reduced until the temperature difference is the same as before the radio frequency energy was applied to the waveguide. The radio frequency energy absorbed is then the difference between the first and the second line power readings.

In accordance with a fourth embodiment of this invention, a water load similar to either the compartment type water load described in conjunction with the first embodiment or the tubular type water load described in conjunction with the second embodiment is provided in an end of the waveguide, and a substantially identical water load is provided in a chamber similar in construction to the waveguide. In operation, radio frequency energy is applied to the waveguide and water is circulated through a heat exchanger and into the waveguide water load, the temperature gradient being measured by suitable temperature measuring devices. The heated water is then passed through the heat exchanger and returned to substantially the temperature obtaining before flowing into the waveguide water load. The water then flows into the second water load disposed in the chamber simulating the waveguide and is heated in passing therethrough by a heating coil associated with the said water load. Sufficient power is applied to the heating coil to cause a temperature gradient equal to that produced by the radio frequency energy absorbed in the first water load, the power required to produce this temperature gradient being a measure of the radio frequency energy.

Other objects and advantages of this invention will be apparent from the following detailed description taken in conjunction with the drawing, wherein:

Fig. 1 is a vertical, sectional view taken along the line 1—1 of Fig. 2 and showing a section of a waveguide having a water load compartment formed therein in accordance with a first embodiment of said invention;

Fig. 2 is a horizontal, sectional view taken along the line 2—2 of Fig. 1;

Fig. 3 is a plan view showing a water load associated with the waveguide constructed in accordance with a second embodiment of this invention;

Fig. 4 is a vertical, sectional view taken substantially along the line 4—4 of Fig. 3; and Fig. 5 is a sectional view similar to Fig. 1, showing, however, a radio frequency power measuring device constructed in accordance with a fourth embodiment of this invention.

Referring now to the drawings and particularly to Figs. 1 and 2 thereof, it will be seen that a section of a waveguide 10 is there illustrated which is substantially rectangular in cross section and is provided with an end wall 11 at its right end. The left end of the waveguide may be connected to any source (not shown) of radio frequency power to be measured, as is well known in the art. A thin, inclined plate 12, formed of a dielectric material such as polystyrene, is mounted within the waveguide and spaced to the left of the end wall 11 so as to provide a substantially trapezoidal, water tight chamber 13 in the right end portion of the waveguide. This plate 12 is, as shown in these drawings, mounted at an acute angle to the upper and lower walls of the waveguide, as viewed in Fig. 1, to avoid reflection of radio frequency energy insofar as feasible. In practice, it has been found that the inclination is not critical, and that by employing a plate of a sufficient length and mounted at such an angle that the distance A is substantially equal to one wavelength, maximum efficiency is attained. It will be understood, of course, that the dimensions of the waveguides must be selected with reference to the frequencies which are to be applied for optimum results.

A water outlet 14 is provided adjacent the left end of the chamber 13 and a water inlet 15 is provided adjacent the end wall 11 and is connected to a suitable water source whereby a constant rate of flow at a substantially constant temperature may be obtained. A thermocouple 16 is associated with the water outlet 14 and a second thermocouple 17 is associated with the water inlet 15. It will be understood, of course, that a thermopile, thermometer, or other suitable temperature measuring device may be substituted for the thermocouples without departing from the present invention. A resistance heating coil 18 is positioned adjacent the right end of the chamber 13 and is connected to a suitable source of electrical power 20, such as 60 cycle line power, the power source 20 having associated therewith a power control device 21 and a power measuring device 22. It will be understood, of course, that a direct current power source may be used where desired.

In using the apparatus shown in Figs. 1 and 2, as water is circulated through the chamber 13 at a constant rate, radio frequency energy is applied to the chamber 13 from the waveguide 10, the difference in reading between the thermocouple 16 and the thermocouple 17 is noted. Then the radio frequency energy is turned off. Thereafter energy is applied to the coil 18 from the power source 20 sufficient to heat the water passing through the chamber 13 to obtain the same temperature difference as was obtained when the water was heated by the radio frequency energy. The power required to obtain this temperature difference using the heating coil 18 is determined by the reading of the power measuring device 22 and is a direct indication of the radio frequency energy previously applied. The power measuring device 22 may, if desired, be directly calibrated. While in both cases there are thermal losses due to the metal side walls of the waveguide and radiation to the air through the connecting hoses and leads, however, since the heating of the water takes place, in both cases, in the same location, the losses are substantially the same and tend to cancel, and the measured line power applied to the heating coil may be taken to be equal to the radio frequency power. It will be understood, of course, that the rate of flow of the water remains the same during the radio frequency and the line power measurements.

In accordance with a second embodiment of the present invention, a power measuring device is provided which in some cases may be somewhat easier to construct. This second embodiment is shown in Figs. 3 and 4, wherein like reference numerals are used to indicate elements corresponding to those described in conjunction with the first embodiment of this invention as shown in Figs. 1 and 2, and appearing in this embodiment. In accordance with this second embodiment, instead of providing the water chamber 13 shown in Figs. 1 and 2, a tube 25, which may be made of glass or other suitable material, is mounted in the right end of the waveguide 10 and rigidly secured thereto. As shown in Fig. 4, the tube 25 may be slightly bent and have one portion mounted in the end plate 11 of the waveguide while the other portion thereof extends through a sidewall of the waveguide 10. In practice it has been found desirable that the tube 25 have a slight taper and that the larger portion of the tube be located adjacent the end wall 11 while the portion that extends to the left therefrom be of gradually diminishing cross-sectional size; this aids in matching the load to the standing wave pattern in the waveguide. A heating coil 26 is located in the right portion of the tube and is pushed up toward the tapered end of the tube until it effects the match between the load and the standing wave pattern and then is withdrawn slightly. It is desirable to push the coil as far as possible toward the tapered end of the tube so that most of the radio frequency heating takes place at the leading (tapered) end of the tube. A water inlet 27 is connected to the larger end of the tube 25 and the inlet 27 is connected to a suitable source of water whereby a constant rate of flow through the tube 25 may be maintained. The tapered end of the tube may be connected to any suitable outlet. Thermocouples 16 and 17 are associated respectively with the outlet and inlet ends of the tube and the heating coil 26 is connected to a source of electrical power 20 provided with a control device 21 and a measuring device 22, as hereinbefore described. The method of employing this alternative power measuring device is substantially the same as that described in connection with the embodiment of the invention shown in Figs. 1 and 2.

An alternative method of making the radio frequency power measurement, which may be used with either of the two embodiments of this invention shown in the drawings, is to apply initially more energy to the heating coil of the water load than the maximum anticipated radio frequency energy to be measured. The temperature difference and power required to produce that difference are noted. Thereafter, radio frequency energy is applied to the water load while the heating coil is energized and the line power is reduced until the temperature difference is the same as that obtaining prior to the application of radio frequency energy. The radio frequency energy absorbed is then the difference between the first and the second line power readings. This method of making the power measurement is superior to that heretofore described in that it is not necessary to turn off the radio frequency power to make a measurement having initially applied more line power to the heating coil than the maximum radio frequency power to be measured.

Using the method and apparatus heretofore described, the water flow rate must be closely controlled and the heating coil must be displaced sufficiently in locating it in the water load so as to prevent interference with the radio frequency energy. While the displacement is slight, it may be sufficient to affect somewhat the accuracy of the test. In order to overcome these difficulties, in accordance with a third embodiment of this invention, a somewhat different method and apparatus may be employed than that heretofore described. Referring to Fig. 5, it will be seen that a wave guide 30, similar to wave guide 10 shown in Figs. 1 to 4, is provided and may be connected to a suitable source of radio frequency energy (not shown). The wave guide 30 is closed at its right end by an end wall 31 and a water load comprising a tube 32, which may be constructed in a manner similar to the tube 25 shown in Figs. 3 and 4, is located in the right end portion of the wave guide. However, a water load similar to that shown in Figs. 1 and 2 may be used equally well. One end of the tube 32 is connected to an outlet port 33 of a heat exchanger designated generally as 34, the other end of the tube being connected to an inlet port 35 of the heat exchanger 34. A thermocouple 36 is connected to the tube 32 at a point closely adjacent the wave guide 30 to measure the temperature of the water as it leaves the portion of the tube lying within the wave guide 30. The heat exchanger 34 is provided with a main inlet 37 which is connected to a suitable source of water, and the heat exchanger, the design of which forms no part of the present invention, is selected to be effective to maintain the temperature of the water as it leaves the heat exchanger within very close limits.

A box-like structure 38, similar to the wave guide 30 in design and dimensions is mounted adjacent the wave guide 30 and has located therein a tube 39 substantially identical with the tube 32. One end of this tube is connected to an outlet port 40 of the heat exchanger 34, the port 40 being directly connected through the coiled tubing 41 to the inlet port 35 thereof. A thermocouple 42 is connected to the tube 39 and located at substantially the same point with respect thereto as the thermocouple 36 is located with respect to the tube 32. A heating coil 43 similar to the heating coil 26 shown in Fig. 4 is located in the tube 39 and is connected through a power control device 44 and a power measuring device 45 to a suitable source of current 46.

In the operation of the radio frequency power measuring apparatus shown in Fig. 5, water is admitted to the heat exchanger 34 from the port 37 and, as shown by the arrows, enters the tube 32 through the outlet port 33 of the heat exchanger 34. In passing through the tube 32 located within the wave guide 30, the water is heated by the radio frequency energy present in the wave guide and the temperature of the heated water is indicated by the thermocouple 36. The heated water then passes through the heat exchanger 34 and is returned to the same temperature obtaining at the time the water enters the tube 32. The water then leaves the heat exchanger 34 through the port 40 and passes into the tube 39. In passing through the tube 39, the water is heated by the application of sufficient current from the current source 46 to the coil to produce the same temperature reading on the thermocouple 42 as was obtained on the thermocouple 36. The power required to obtain this second temperature reading is a direct indication of the power absorbed by the water load 32 and of the radio frequency energy present in the wave guide.

It will be apparent that the water flow rate will be identical in the tube 32 with that in the tube 39 and that assuming an efficient heat exchanger 34 the temperature of the water as it reaches the tube 39 will be the same as the temperature of the water as it reaches the tube 32. Thus variations in temperature between tests or in rate of flow are substantially avoided in this embodiment of the present invention since they are cancelled. Furthermore, the heating coil can be placed in the optimum position in the tube 39 to duplicate the effect of the radio frequency energy applied to the tube 32 without danger of interfering with the standing wave pattern in the wave guide.

In this third embodiment of the present invention, by connecting the temperature measuring elements 36 and 42 to a common indicating device whereby the temperature differential may be read directly, as is well known in the art, a somewhat more facile utilization of the apparatus may be had. Where the temperature measuring elements are so connected, it then is necessary only to adjust the line power applied to the heating coil 43 to obtain an indication of balance on the temperature differential indicating device. This may be referred to as a null method.

Where herein the various parts of the invention have been referred to as being located in a right or left, or upper or lower position, it will be understood that this is done solely for the purpose of facilitating description and that the references relate only to the relative positions of the parts as shown in the accompanying drawings.

While this invention has been shown and described in conjunction with a waveguide type of transmission line, it will be understood that it is equally applicable to other types of radio frequency transmission lines, such, for example, as coaxial lines, and that many changes and modifications may be made in the present invention without departing from the spirit or scope thereof.

The invention shown and described herein may be manufactured or used by or for the Government of the United States of America for governmental purposes without the payment of any royalties thereon or therefor.

What is claimed is:

1. In an apparatus for measuring radio frequency power, a radio frequency transmission line, a tube having a portion thereof disposed within said transmission line, means for circulating water through said tube, means for measuring the temperature of the water as it is applied to said tube, means for measuring the temperature of the water as it leaves said portion of said tube and means disposed within said tube for heating the water in said tube.

2. A radio frequency energy measuring device comprising a closed wave guide section fed by the energy to be measured, a tapered tube of dielectric material angularly positioned in said section with respect to the direction of energy propagation therein, means circulating energy absorbing fluid through said tube, fluid heating means positioned in said tube, and means measuring temperature variations of the fluid circulating through said tube.

References Cited in the file of this patent

UNITED STATES PATENTS

| | | |
|---|---|---|
| 1,156,503 | Sheldon | Oct. 12, 1915 |
| 2,314,764 | Brown | Mar. 23, 1943 |
| 2,344,641 | Rosencrans | Mar. 21, 1944 |
| 2,354,809 | Goldstine | Aug. 1, 1944 |
| 2,387,158 | Kozanowski | Oct. 16, 1945 |
| 2,398,606 | Wang | Apr. 16, 1946 |
| 2,400,777 | Okress | May 21, 1946 |
| 2,427,094 | Evans | Sept. 9, 1947 |
| 2,430,130 | Linder | Nov. 4, 1947 |
| 2,453,645 | Tiley | Nov. 9, 1948 |
| 2,491,669 | Larson | Dec. 20, 1949 |
| 2,497,093 | Moreno | Feb. 14, 1950 |
| 2,567,379 | Kienow | Sept. 11, 1951 |